United States Patent
Miyata

(10) Patent No.: US 10,452,595 B2
(45) Date of Patent: Oct. 22, 2019

(54) INFORMATION PROCESSING APPARATUS AND METHOD OF CONTROLLING THE SAME

(71) Applicant: CANON KABUSHIKI KAISHA, Tokyo (JP)

(72) Inventor: Takaaki Miyata, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 255 days.

(21) Appl. No.: 14/887,533

(22) Filed: Oct. 20, 2015

(65) Prior Publication Data

US 2016/0124893 A1    May 5, 2016

(30) Foreign Application Priority Data

Nov. 4, 2014  (JP) .................................. 2014-224620

(51) Int. Cl.
  *G06F 13/42*  (2006.01)
  *G06F 13/40*  (2006.01)
  *G06F 13/22*  (2006.01)

(52) U.S. Cl.
  CPC .......... *G06F 13/4282* (2013.01); *G06F 13/22* (2013.01); *G06F 13/404* (2013.01)

(58) Field of Classification Search
  None
  See application file for complete search history.

(56) References Cited

U.S. PATENT DOCUMENTS

| | | | | |
|---|---|---|---|---|
| 6,546,483 B1 * | 4/2003 | Lai | ........................ | G06F 9/4411 710/10 |
| 6,574,695 B1 * | 6/2003 | Mott | .................... | G06F 13/4027 710/302 |
| 9,432,298 B1 * | 8/2016 | Smith | ................. | H04L 49/9057 |
| 2006/0059249 A1 * | 3/2006 | Wei | ..................... | G06F 9/45512 709/220 |
| 2006/0239287 A1 | 10/2006 | Johnsen et al. | | |

(Continued)

FOREIGN PATENT DOCUMENTS

| | | |
|---|---|---|
| JP | 2000207346 A | 7/2000 |
| JP | 2004021948 A | 1/2004 |
| JP | 2007241526 A | 9/2007 |

OTHER PUBLICATIONS

Office Action issued in Japanese Appln. No. 2014-224620 dated May 25, 2018.

(Continued)

*Primary Examiner* — Henry Tsai
*Assistant Examiner* — Christopher A Bartels
(74) *Attorney, Agent, or Firm* — Rossi, Kimms & McDowell LLP

(57) ABSTRACT

Provided is an information processing apparatus including a processor and a PCI node connected to the processor via a first PCI bus, the processor obtaining a class code and a subclass code from the PCI node connected to the first PCI bus, determining whether or not the PCI node is a bridge based on the obtained class code and subclass code, searching for a PCI node connected to the PCI node via a second PCI bus based on having determined that the PCI node is a bridge, and searching for another PCI node connected to the first PCI bus based on having determined that the PCI node is not a bridge.

10 Claims, 7 Drawing Sheets

(56) References Cited

U.S. PATENT DOCUMENTS

| | | | | |
|---|---|---|---|---|
| 2013/0311817 | A1* | 11/2013 | Kim | G06F 1/04 |
| | | | | 713/501 |
| 2014/0189427 | A1* | 7/2014 | Jayaprakash Bharadwaj | |
| | | | | G06F 11/1415 |
| | | | | 714/15 |
| 2014/0198790 | A1* | 7/2014 | Christenson | H04L 43/0811 |
| | | | | 370/392 |
| 2014/0237156 | A1* | 8/2014 | Regula | G06F 13/4027 |
| 2014/0359044 | A1* | 12/2014 | Davis | H04L 45/60 |
| | | | | 709/213 |
| 2015/0180782 | A1* | 6/2015 | Rimmer | H04L 69/22 |
| | | | | 370/236 |
| 2015/0263970 | A1* | 9/2015 | Macchiano | H04L 45/22 |
| | | | | 709/223 |
| 2016/0299860 | A1* | 10/2016 | Harriman | G06F 13/36 |
| 2017/0206166 | A1* | 7/2017 | Kumar | G06F 12/0888 |

OTHER PUBLICATIONS

Yamatake "Operation of PCI-PCI bridge and a creation method of a built-in PCI BIOS, a tree configuration of PCI bus and operation of PCI BIOS." Interface, Japan, CQ Publishing Co., Ltd., Jan. 1, 2004: pp. 94-108, vol. 30, No. 1. Cited in NPL. 1.

* cited by examiner

FIG. 3A

| Device ID 300 | | Vendor ID 301 | | 00h |
|---|---|---|---|---|
| Status Register | | Command Register | | 04h |
| Class Code | SubClass | Programming I/F | Revision ID | 08h |
| BIST | Header Type | Latency Timer | Cache Line Size | 0Ch |

| Vendor ID | Vendor Name |
|---|---|
| 0x11AC | ABC |
| : | : |

FIG. 3C

Class Code

| 0x02 | Network controllers |
|---|---|
| 0x03 | Display controllers |
| 0x06 | Bridges |
| 0x0B | Processors |
| : | : |

FIG. 3D

SubClass

| 0x01 | ISA bridge |
|---|---|
| 0x04 | PCI-to-PCI bridge |
| 0x05 | PCMCIA bridge |
| 0x06 | NuBUS Bridge |
| 0x07 | CardBus bridge |
| 0x80 | Other bridge device |
| : | : |

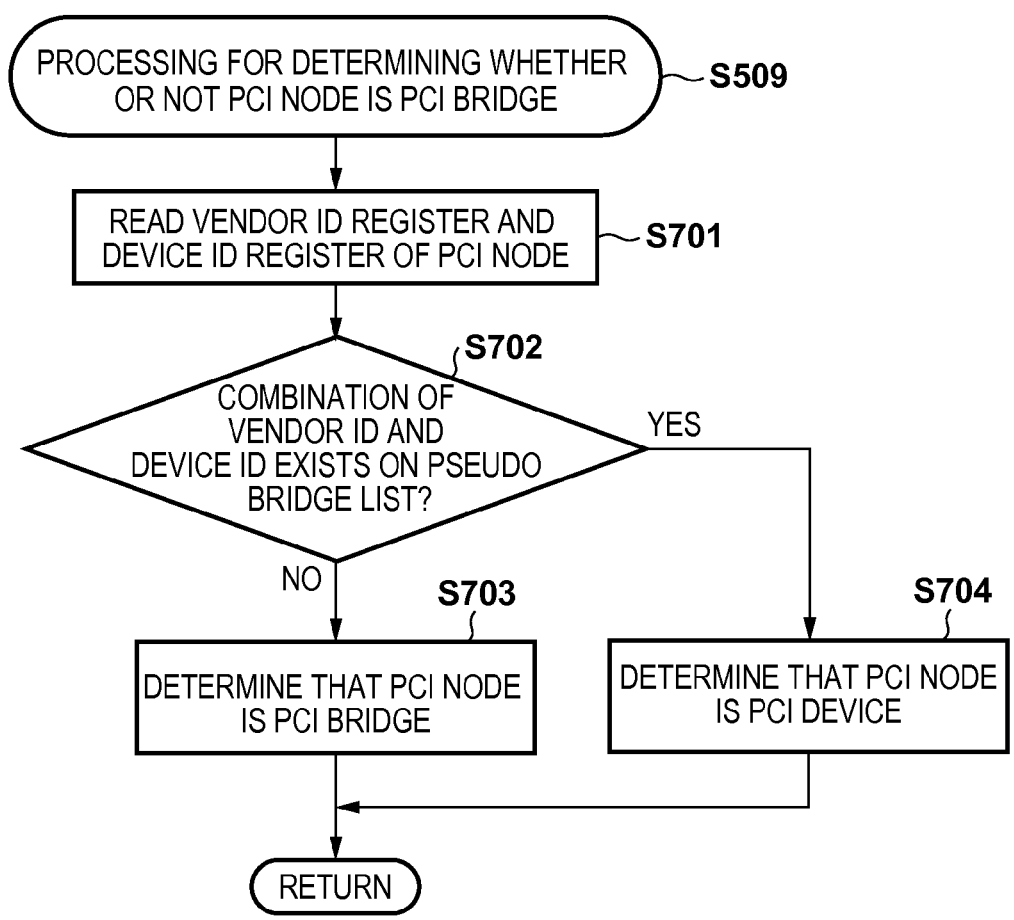

INFORMATION PROCESSING APPARATUS AND METHOD OF CONTROLLING THE SAME

BACKGROUND OF THE INVENTION

Field of the Invention

The present invention relates to an information processing apparatus and a method of controlling the same.

Description of the Related Art

In recent years, startup times of image forming apparatuses provided with a CPU have tended to become longer, due to the number of peripheral devices of the CPU having increased. Bus architectures for connecting such peripheral devices include PCI, for example, and the CPU initializes respective devices connected via PCI buses when starting a BIOS, a loader, or a kernel. In PCI, a plurality of nodes are arranged in a bus tree structure. That is, a PCI device and a PCI bridge are connected to a PCI bus, and the PCI bridge, in particular, is connected to another PCI bus. By interposing a PCI bridge in this manner, the PCI buses can be connected at multiple levels, enabling more PCI devices to be connected.

When initializing the PCI devices at the time of starting the BIOS, the loader, or the kernel, the CPU repeatedly searches for a bridge on the PCI bus that is closest to the CPU and searches for a bridge on a PCI bus ahead of the found bridge. Eventually, all the devices connected to the PCI buses are initialized in this manner. Note that hereinafter, PCI bridges and PCI devices are collectively referred to as PCI nodes.

Japanese Patent Laid-Open No. 2007-241526 describes a technology for achieving faster startup in such apparatuses (as described above) by connecting a system controller for searching for and initializing PCI-connected devices externally to an information processing system. In this document, the system controller, while initializing a host bus between a processor system and a bridge, initializes peripheral devices connected to the bridge. However, in this document, a PCI-PCI bridge and a host-PCI bridge are described, but description is not given regarding determination of the type of PCI bridge or execution of initialization processing.

In the case of a PCI connection, conventionally, when determining whether a PCI node connected to a PCI bus is a PCI bridge or a PCI device, the class code register of the PCI configuration register of that PCI node was referred to. That is, if the class code register is 0x06 (PCI bridge), it was determined that the PCI node was a PCI bridge.

However, in some cases, a PCI device whose class code register of the PCI configuration register is 0x06 (PCI bridge) (hereinafter, referred to as pseudo bridge) exists in an apparatus. In such cases, a further search will be conducted for a PCI node that does not exist ahead of the PCI device. At this time, for example, loss of at least one second of the startup time occurs for each pseudo bridge. In general, in an image forming apparatus aiming for a startup of no more than 30 seconds, for example, occurrence of loss of approximately one second of the startup time simply due to the BIOS can damage the value of the product as an image forming apparatus.

SUMMARY OF THE INVENTION

An aspect of the present invention is to eliminate the above-mentioned problems with the conventional technology.

The feature of the present invention is to provide a technique for preventing a delay in a startup time due to a pseudo bridge by precisely detecting the pseudo bridge.

According to a first aspect of the present invention, there is provided an information processing apparatus, comprising: a processor; and a PCI node connected to the processor via a first PCI bus; wherein the processor obtains a class code and a subclass code from the PCI node connected to the first PCI bus and determines whether or not the PCI node is a bridge based on the obtained class code and subclass code, wherein the processor searches for a PCI node connected to the PCI node via a second PCI bus based on having determined that the PCI node is a bridge and searches for another PCI node connected to the first PCI bus based on having determined that the PCI node is not a bridge.

According to a second aspect of the present invention, there is provided an information processing apparatus, comprising: a processor; and a PCI node connected to the processor via a first PCI bus; wherein the processor obtains a vendor ID and a device ID from the PCI node connected to the first PCI bus and determines based on the obtained vendor ID and the device ID whether or not the PCI node is a bridge, searches for a PCI node connected to the PCI node via a second PCI bus based on having determined that the PCI node is a bridge, and searches for another PCI node connected to the first PCI bus based on having determined that the PCI node is not a bridge.

According to a third aspect of the present invention, there is provided a method of controlling an information processing apparatus having a processor and a PCI node connected to the processor via a first PCI bus, the method comprising: causing the processor to obtain a class code and a subclass code from the PCI node connected to the first PCI bus; causing the processor to determine whether or not the PCI node is a bridge based on the obtained class code and subclass code; causing the processor to search for a PCI node connected to the PCI node via a second PCI bus based on the processor having determined that the PCI node is a bridge; and causing the processor to search for another PCI node connected to the first PCI bus based on the processor having determined that the PCI node is not a bridge.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3D are diagrams each showing an example of a content of the PCI configuration register that is described in PCI Local Bus Specification Revision 3.0.

FIG. 7A is a diagram showing an example of a combination of a vendor ID and a device ID of a PCI node that can connect to an image forming apparatus according to a second embodiment and was found in advance to be a pseudo bridge.

FIG. 7B is a flowchart for describing aforementioned processing of step S509 in FIG. 5 that is performed by a CPU of a control unit of the image forming apparatus according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that in the following description, as an example of an image forming apparatus typified by a printer or the like, an MFP (multi-function peripheral) including a scanner function, a printer function, and a FAX function will be described, but the information processing apparatus according to the present invention is not limited thereto. For example, the present invention is also applicable to an image processing apparatus including one or more of the scanner function, the printer function, and the FAX function, and to a general information processing apparatus typified by a PC or the like.

First Embodiment

Figure 1:
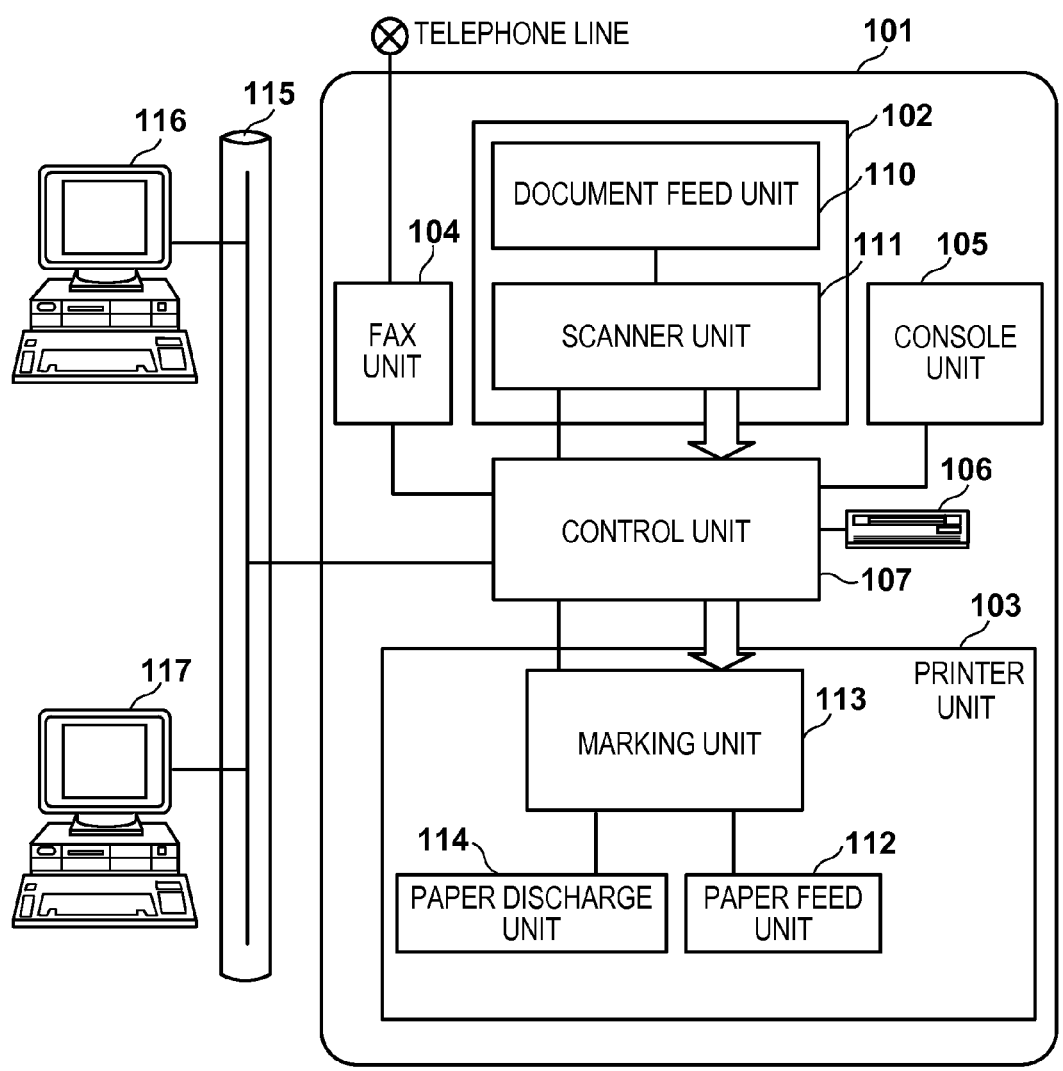
FIG. 1 is a block diagram for describing a hardware configuration of an image forming apparatus (MFP) according to a first embodiment of the present invention.

FIG. 1 is a block diagram for describing the hardware configuration of an image forming apparatus (MFP) 101 according to the first embodiment of the present invention.

The image forming apparatus 101 is connected to a PC 116 and a PC 117 via a LAN 115. Moreover, the image forming apparatus 101 includes a reader unit 102, a printer unit 103, a FAX unit 104, a console unit 105, a storage unit 106 such as a hard disk, and a control unit 107.

The reader unit 102 reads the image of a document and outputs image data corresponding to the image. This reader unit 102 includes a document feed unit 110 for conveying the document to the position of a scanner unit 111, and the scanner unit 111 for optically reading the conveyed document and generating the image data.

The printer unit 103 performs printing on sheets based on image data. The printer unit 103 includes a paper feed unit 112 for conveying the sheets used for the printing to a marking unit 113, the marking unit 113 for printing images on those sheets, and a paper discharge unit 114 for discharging the printed sheets. The paper feed unit 112 is provided with a feeding cassette with multiple stages for housing a plurality of sheets. The marking unit 113 prints images on sheets in accordance with image data from the control unit 107. The paper discharge unit 114 performs sorting processing or stapling processing on printed sheets and discharges the sheets.

The console unit 105 accepts various instructions in accordance with a user operation on a key or a touch panel. Moreover, the console unit 105 notifies the user of various information via the touch panel. The storage unit 106 is a large capacity storage unit such as a hard disk or a memory card for storing control programs, image data, and the like. The FAX unit 104 performs transmission/reception processing of facsimiles. The control unit 107 is connected to various components such as the reader unit 102, the printer unit 103, the console unit 105, the storage unit 106, and the FAX unit 104, and controls the operations of those units.

Figure 2:
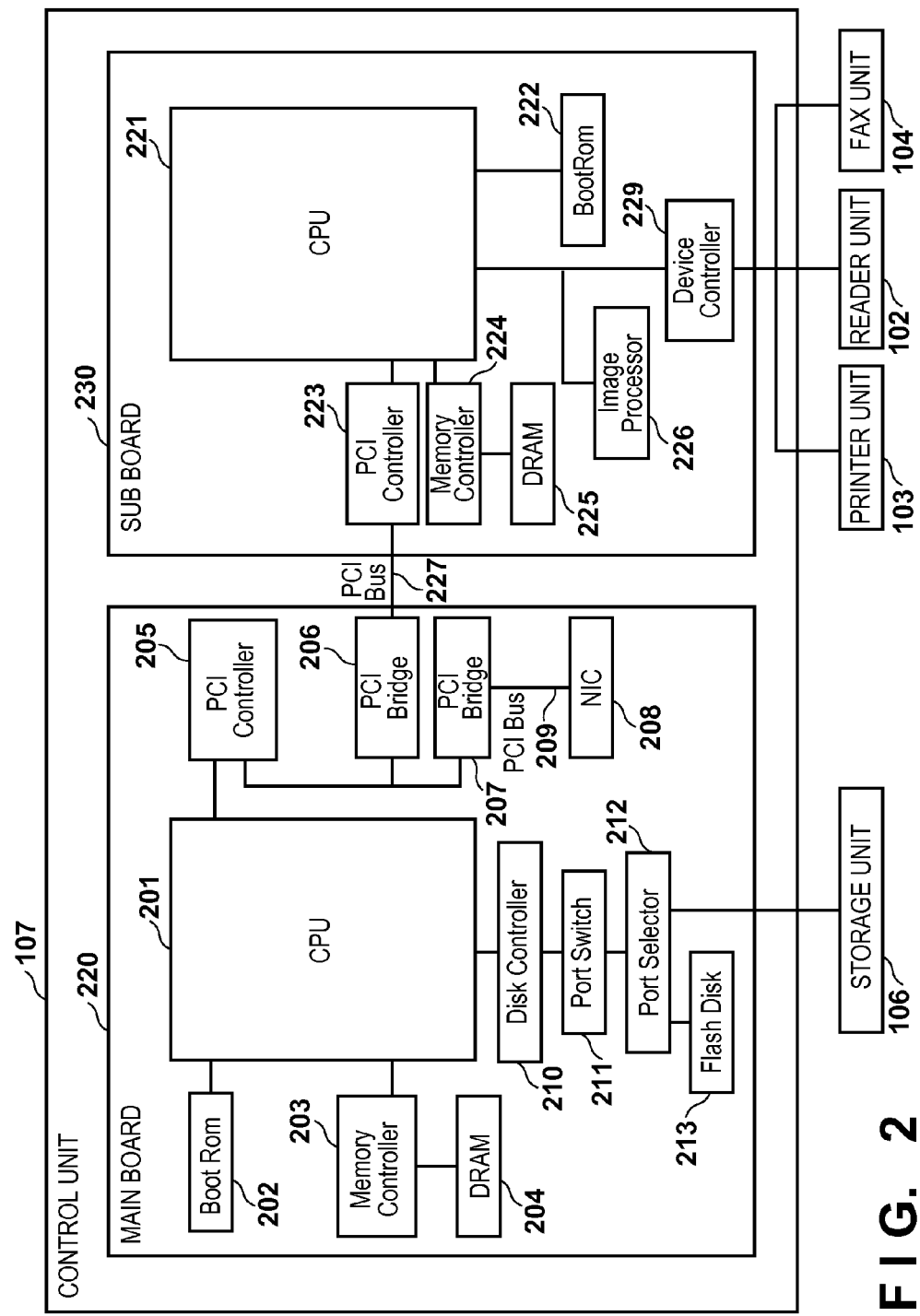
FIG. 2 is a block diagram for describing a hardware configuration of a control unit of the image forming apparatus according to the first embodiment.

FIG. 2 is a block diagram for describing the hardware configuration of the control unit 107 of the image forming apparatus 101 according to the first embodiment.

The control unit 107 broadly includes a main board 220 for general information processing and a sub board 230 for image forming processing. Note that the main board 220 and the sub board 230 may be configured as one board. Here, the main board 220 and the sub board 230 are connected via a PCI bus (input/output bus) 227. A CPU 201 of the main board 220 performs data exchange with the sub board 230 via a PCI bridge 206 connected to a PCI bus connected to the CPU 201 and the PCI bus 227.

A Boot Rom 202, the CPU 201, a PCI controller 205, a disk controller 210, a port switch 211, a port selector 212, and a flash disk 213 are mounted on the main board 220. A memory controller 203, a DRAM 204, the PCI bridges 206 and 207, and a NIC 208 are also mounted on the main board 220.

The Boot Rom 202 is a nonvolatile storage medium, and stores a startup program and the like. The CPU 201 executes the startup program, an OS, application programs and the like. The PCI controller 205 controls data exchange between the NIC 208 and the sub board 230. The disk controller 210 controls the storage unit 106 via the port switch 211 and the port selector 212. The port switch 211 switches ON/OFF access via the port selector 212 upon reception of an instruction from the CPU 201. The port selector 212 connects the flash disk 213 and the storage unit 106, and selects which one is to be accessed. The flask disk 213 is a nonvolatile storage medium, and stores an OS, application programs and the like. The memory controller 203 controls the DRAM 204. The DRAM 204 is a volatile storage medium, and temporarily stores programs, image data, and the like to be used by the CPU 201.

The PCI bridge 206 performs data relay via the PCI bus 227 between the PCI controller 205 and a PCI controller 223 of the sub board 230. The PCI bridge 207 performs data relay via a PCI bus 209 between the PCI controller 205 and the NIC 208. The NIC (Network Interface Card) 208 is communicable with the PC 116 and the PC 117 via the LAN 115.

Next, the configuration of the sub board 230 will be described.

A CPU 221, a Boot Rom 222, the PCI controller 223, a memory controller 224, a DRAM 225, an image processor 226, a device controller 229 and the like are implemented on the sub board 230. The Boot Rom 222 is a nonvolatile storage medium, and stores a startup program and the like. The CPU 221 executes the startup program, an OS, application programs, and the like. The memory controller 224 controls the DRAM 225. The DRAM 225 is a volatile storage medium, and temporarily stores programs, image data, and the like to be used by the CPU 221. The image processor 226 executes various types of image processing on image data. The PCI controller 223 controls data exchange with the main board 220. The device controller 229 controls the reader unit 102, the printer unit 103, and the FAX unit 104. Note that the console unit 105 is connected to the CPU 201 via a bus (not illustrated).

FIGS. 3A to 3D are diagrams each showing an example of the content of the PCI configuration register that is described in PCI Local Bus Specification Revision 3.0.

FIG. 3A shows the first 16 bytes of the PCI configuration register. Only registers related to this embodiment will be described below. Here, smaller cells indicate one byte, and larger cells indicate two bytes, respectively.

A device ID register 300 stores a two-byte code assigned by a manufacturing vendor and used for identifying a PCI node, and is read-only. A vendor ID register 301 stores a two-byte code indicating the manufacturing vendor of this PCI node, and is read-only. A class code register 302 stores a code indicating a function of this PCI node, and is read-only. A subclass register 303 stores a code supplementing the code of the class code register 302, which is defined for each code stored in the class code register 302, and is read-only.

FIG. 3B is a diagram showing an example of a code stored in the vender ID register 301. Here, for example, the case of a PCI node manufactured by ABC company is shown, and a code "0x11AC" corresponding to the vendor name code (ABC company) is stored. Unique two-byte codes are also defined similarly for other vendors.

FIG. 3C is a diagram showing examples of codes stored in the class code register 302. Here, for example, if the PCI node is a PCI bridge, a class code "0x06" indicating this is stored. Unique one-byte codes are also defined for other functions.

FIG. 3D is a diagram showing examples of codes stored in the subclass register 303 in the case where the code in the class code register 302 is "0x06" indicating a PCI bridge. For example, if the PCI bridge is a "PCI-to-PCI bridge", a code "0x04" indicating this is stored. Moreover, besides the PCI-to-PCI bridge, ten other types of unique one byte codes are defined. Furthermore, in the case of a PCI bridge that does not correspond to any of these 11 types, a code "0x80" indicates that the PCI bridge is another type of bridge is stored.

Figure 4:
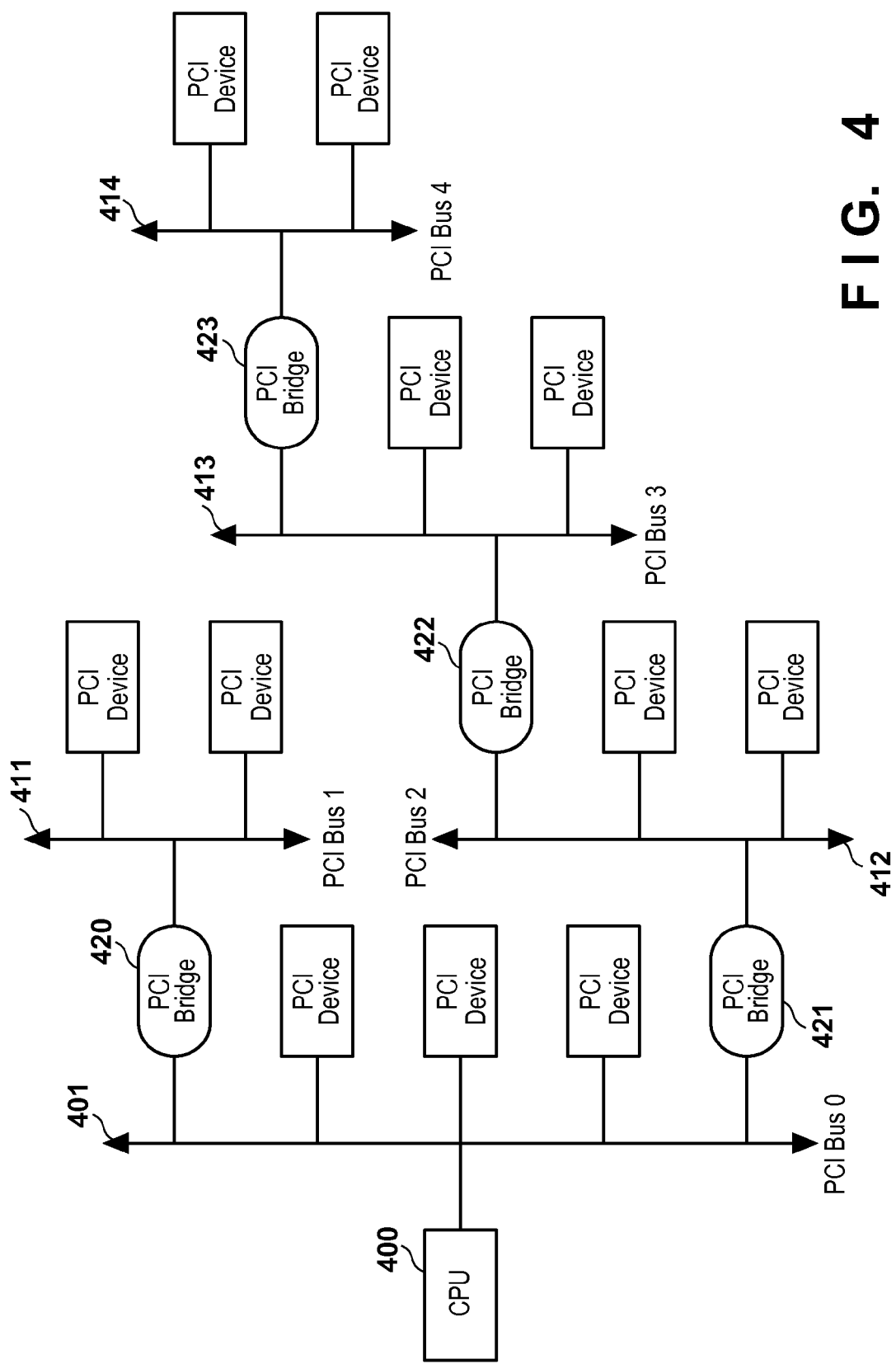
FIG. 4 is a block diagram showing an example of a configuration of general PCI buses which are connected at multiple levels to a CPU, with PCI devices connected to each of the buses.

FIG. 4 is a block diagram for describing an example of the configuration of general PCI buses in which the PCI buses are connected at multiple levels to a CPU 400 and PCI devices (peripheral devices) are connected to each of the buses. Note that it is assumed that PCI nodes connected to the PCI buses are arranged in order of device number from the top. Next, description will be given with reference to FIG. 4 regarding how the CPU 400 searches for a PCI bus using a startup program such as a BIOS, a loader, or a kernel.

First, the CPU 400 detects, from among PCI bridges 420 and 421 on a PCI bus (PCI bus 0) 401 connected to the CPU 400, a PCI bridge with the smallest device number (here, the PCI bridge 420). Furthermore, a PCI bus (here, a PCI bus 411) connected to the detected PCI bridge (here, the PCI bridge 420) is detected. Next, it is determined whether or not a PCI bridge is included among PCI nodes that are connected to the detected PCI bus (here, the PCI bus 411). If it is determined here that a PCI bridge does not exist, a PCI bridge (here, the PCI bridge 421) with the second smallest device number on the PCI bus 0 (401) is detected. After that, the same processing as that described above will be then performed.

On the other hand, in the case where it is determined that PCI nodes connected to a PCI bus connected to the detected PCI bridge include a PCI bridge, a PCI bus connected to the PCI bridge is further detected. It is then determined whether or not PCI nodes connected to the detected PCI bus include a PCI bridge. After that, such processing is executed until PCI bridges are no longer detected.

Description will be given using the example in FIG. 4. First, the CPU 400 detects the PCI bridge 420 with the smallest device number which is connected to the PCI bus 401 (PCI Bus 0). Next, the PCI bus 411 (PCI Bus 1) connected to this PCI bridge 420 is detected. Here, when it is determined whether or not PCI nodes connected to the PCI bus 411 include a PCI bridge, the search on the PCI bus 411 connected to the PCI bridge 420 is ended because a PCI bridge does not exists here.

Subsequently, the CPU 400 detects the PCI bridge 421 with a second smallest number which is connected to the PCI bus 401. A PCI bus 412 (PCI Bus 2) connected to the PCI bridge 421 is then detected. It is then determined whether or not PCI nodes connected to the PCI bus 412 include a PCI bridge. Here, a PCI bridge 422 exists. Accordingly, the CPU 400 detects a PCI bus 413 (PCI Bus 3) connected to the PCI bridge 422. Next, it is determined whether or not PCI nodes connected to the PCI bus 413 includes a PCI bridge. Thereby, it can be seen that a PCI bridge 423 exists. Therefore, a PCI bus 414 (PCI Bus 4) connected to the PCI bridge 423 is detected. Next, when it is then determined whether or not PCI nodes connected to the PCI bus 414 include a PCI bridge, the search on the PCI bus 414 connected to the PCI bridge 423 is ended because a PCI bridge does not exists on the PCI bus 414.

Then, at this point, there is no other PCI bridge connected to the PCI bus 401 (PCI Bus 0), and thus the search for PCI buses is ended. Such a search for PCI buses is executed at the time of the startup of the apparatus, and initialization of PCI devices connected to the PCI buses is executed.

Figure 5:
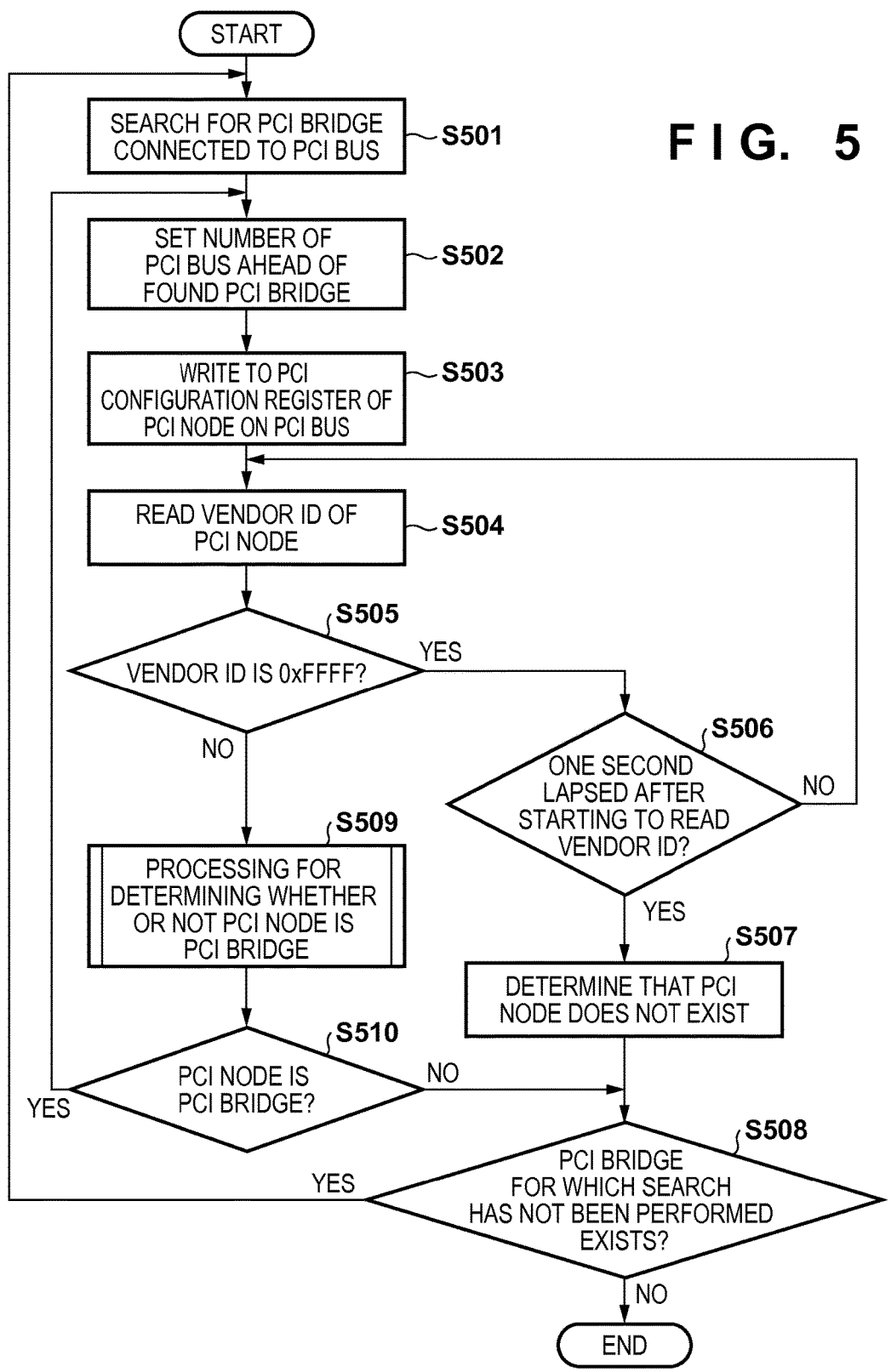
FIG. 5 is a flowchart for describing processing for searching for a connected PCI bus that is performed by a CPU of the control unit of the image forming apparatus according to the first embodiment.

FIG. 5 is a flowchart for describing the processing for searching for the connected PCI buses performed by the CPU 201 of the control unit 107 of the image forming apparatus 101 according to the first embodiment. The processing shown in this flowchart is achieved by deploying, in the DRAM 204, a program stored in the storage unit 106 or the flash disk 213 using the startup program stored in the Boot Rom 202, and by the CPU 201 executing the program.

First, in step S501, the CPU 201 searches for a PCI bridge connected to a PCI bus connected to the CPU 201. At this time, in a first search operation, a search starting from a PCI node with the smallest bus number, device number, and function number is performed. In the case of the control unit 107 in FIG. 2, the PCI bridge 206 is found first. Next, the procedure advances to step S502, and the CPU 201 sets a bus number of a PCI bus connected to and ahead of the PCI bridge 206 that was found in step S501 (in an example in FIG. 2, the PCI bus 227). Next, the procedure advances to step S503, and the CPU 201 performs writing to the PCI configuration register of a PCI node on the PCI bus 227.

Next, the procedure advances to step S504, and the CPU 201 reads the vender ID register 301 of the PCI node mentioned with regard to step S503. Then, the procedure advances to step S505, and the CPU 201 determines whether or not a content of the vender ID register 301 is "0xFFFF" indicating the case where a device number showing that nothing is connected to the PCI bus is designated. Then, in this case, the content of the vender ID register 301 is invalid and thus the procedure advances to step S506. In step S506, the CPU 201 determines whether or not one second has elapsed after reading the vender ID register 301, and if one second has elapsed, the procedure advances to step S507, where the CPU 201 determines that the PCI bus does not include a PCI node, and the procedure advances to step S508. Note that if it is determined in step S506 that one second has not elapsed, the procedure returns to step S504.

On the other hand, if the CPU 201 determines in step S505 that the content of the vender ID register 301 is not "0xFFFF", the procedure advances to step S509, and the CPU 201 executes processing for determining whether or not the PCI node whose register was written in step S503 is a PCI bridge. This processing for determination will be described later with reference to FIG. 6. Then, the procedure advances to step S510, and the CPU 201 determines whether or not the PCI node is a PCI bridge, and if it is determined that the PCI node is a PCI bridge, the procedure advances to step S502 so as to execute the above-described processing on the PCI bridge. Moreover, in step S510, when the CPU 201 determines that the PCI node is not a PCI bridge, the procedure advances to step S508. In step S508, the CPU 201 determines whether or not there is a PCI bridge for which the search has not been performed. If there is a PCI bridge for which the search has not been performed, the procedure advances to step S501, and otherwise ends this processing.

In the case where the processing shown in this flowchart is applied to the control unit 107 of the image forming apparatus 101 in FIG. 2 which was described above, the PCI bridge 206 is found in a first search for a PCI bridge in step S501. Therefore, in a subsequent step S502, the PCI bus 227 will be the target of the search. Furthermore, in step S503, the sub board 230 will be the target of the search. In FIG. 2, no PCI buses exist ahead of the sub board 230 connected to the PCI bus 227. Therefore, the sub board 230 is recognized as a PCI device.

However, in the case where it is determined in step S510 that the PCI node is a PCI bridge, the procedure advances to step S502, and a second search for a PCI bridge is performed on the sub board 230 as a search target. Here, in the step S502, a PCI bus ahead of the sub board 230 that does not exist will be targeted for processing, and in steps S503 and S504, a PCI node ahead of the sub board 230, which does not exist, will be a target for processing. Then, in step S504, because a vendor ID register of that a PCI node which does not exist is read, only a code "0xFFFF" can be read however much time is spent, whereby a loss of one second of a startup time will occur.

Figure 6:
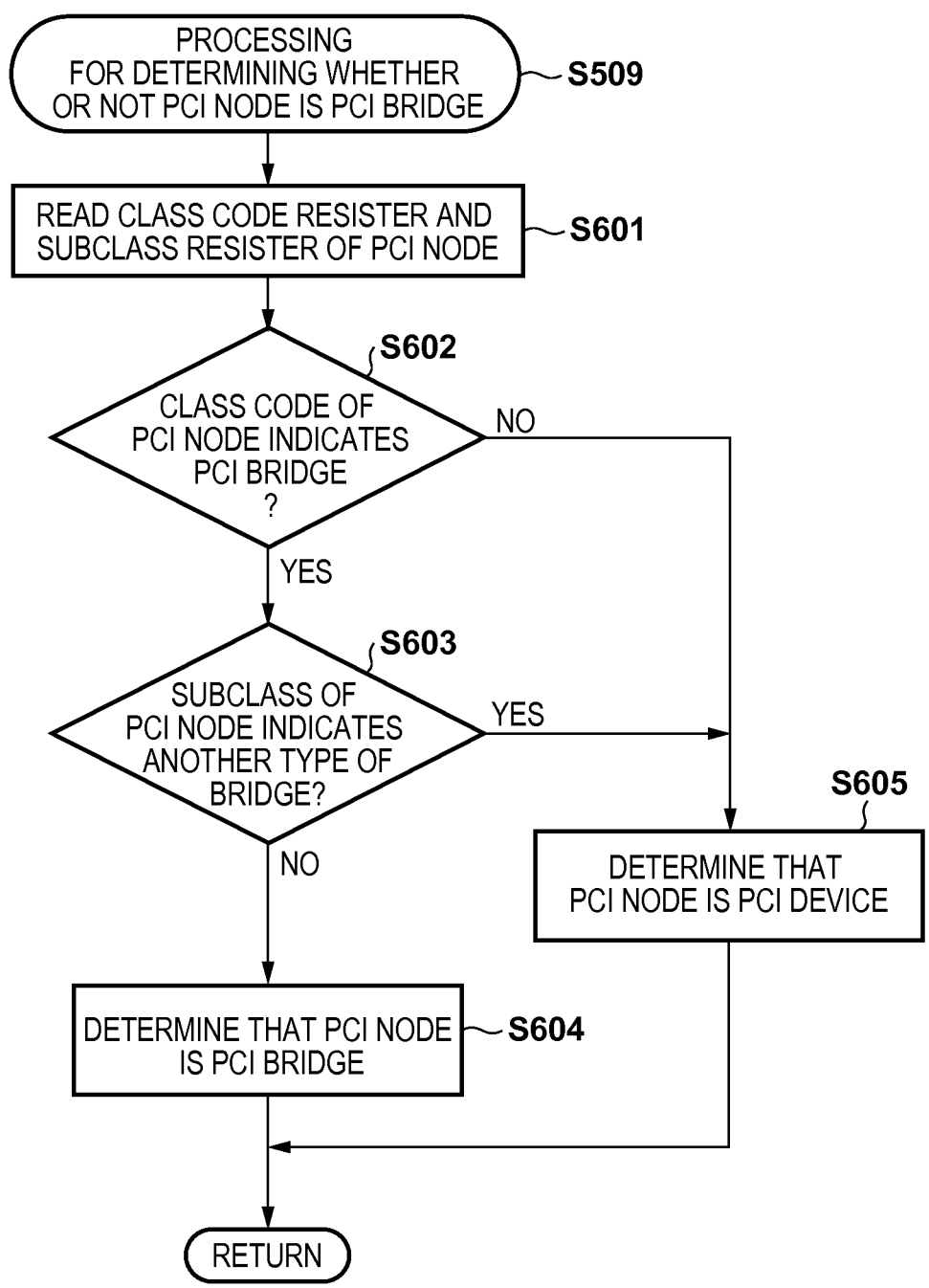
FIG. 6 is a flowchart for describing processing of step S509 in FIG. 5 for determining whether or not a PCI node is a PCI bridge in the first embodiment.

FIG. 6 is a flowchart for describing processing for determination whether or not the PCI node of step S509 in FIG. 5 is a PCI bridge in the first embodiment.

First, in step S601, the CPU 201 reads the class code register 302 and the sub-class register 303 of the PCI node. Next, the procedure advances to step S602, and the CPU 201 determines whether or not the content of the class code register 302 read in step S601 is the code "0x06" indicating that the PCI node is a PCI bridge. If it is determined here that the content is the code indicating a PCI bridge, the procedure advances to step S603, and otherwise the procedure advances to step S605. In step S603, the CPU 201 determines whether or not a content of the subclass register 303 read in step S601 is a code "0x80" indicating that the PCI node is another type of bridge. If the CPU 201 determines in step S603 that the code is "0x80", the procedure advances to step S605, and otherwise the procedure advances to step S604. In step S604, the CPU 201 determines that the PCI node is a PCI bridge, and ends this processing. On the other hand, in step S605, the CPU 201 determines that the PCI node is a PCI device, and ends this processing.

As described above, according to the first embodiment, even in the case where it is determined based on the class code register that the PCI node is a PCI bridge, when the PCI node is identified as another type of bridge based on the subclass register, it can be determined that the PCI node is a pseudo bridge. Thereby, compared with a conventional technology in which it is determined whether or not the PCI node is a PCI bridge only based on the content of the class code register, the possibility of an erroneous determination that the PCI node is a PCI bridge is reduced. Therefore, in the flowchart in FIG. 5, after the procedure advances to step S502 when it is determined in step S510 that the PCI node is a PCI bridge, and steps S503 and S504 are executed, it is determined in step S505 that a vendor ID is not included, and thus the procedure advances to step S506, reducing the possibility of the loss of one second occurring at the time of startup.

Second Embodiment

Next, the second embodiment of the present invention will be described. In the second embodiment, a pair of a vendor ID and a device ID of a PCI node that is a pseudo bridge is registered in advance, so that a PCI node that is a pseudo bridge is determined. Note that the hardware configuration and the like of the image forming apparatus 101 according to the second embodiment are the same as those of the above-described first embodiment, and thus description thereof is omitted.

FIG. 7A is a diagram showing examples of combinations of vendor IDs and device IDs of a PCI node that can connect to the image forming apparatus 101 according to the second embodiment and was found in advance to be a pseudo bridge.

In the second embodiment, from among PCI nodes that can be connected to the image forming apparatus 101, a PCI node, the combination of whose vendor ID and device ID is individually (0x11AC, 0x0001), (0x11AC, 0x0002), or (0x11AC, 0x0003) is assumed to be a pseudo bridge.

FIG. 7B is a flowchart for describing the above-described processing of step S509 in FIG. 5, which is performed by the CPU 201 of the control unit of the image forming apparatus 101 according to the second embodiment.

First, in step S701, the CPU 201 reads the contents of the vender ID register 301 and the device ID register 300 of the PCI node. Next, the procedure advances to step S702, and the CPU 201 determines whether or not the combination of the vendor ID and the device ID which were read in step S701 matches any of the combinations on a pseudo bridge list in FIG. 7A. If it is determined here that the combination of the vendor ID and the device ID matches any of the combinations on the list, the procedure advances to step S704, and otherwise the procedure advances to step S703. In step S703, the CPU 201 determines that the PCI node is a PCI bridge, and ends this processing. On the other hand, in step S704, the CPU 201 determines that the PCI node is a PCI device, and ends this processing.

As described above, according to the second embodiment, even in the case where the PCI node is a pseudo bridge, erroneous determination that the PCI node is a PCI bridge can be reliably avoided. Therefore, according to the flowchart in FIG. 5, occurrence of loss of one second of a startup time for each pseudo bridge that exists is eliminated.

This second embodiment is particularly effective not only for an image forming apparatus, but also for an embedded system in which PCI nodes to be connected are known in advance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-224620, filed Nov. 4, 2014, which is hereby incorporated by reference herein in its entirety.

What is claimed is:

1. An information processing apparatus comprising:
a processor;
at least one peripheral component interconnect (PCI) bus connected to the processor; and
wherein the processor determines to:
based on a class code and a subclass code of a PCI node on the at least one PCI bus, whether or not execute a search for a downstream PCI node on a PCI bus at a downstream side of the PCI node and initialize the searched downstream PCI node, execute the search:
in a case where the class code and the subclass code of the PCI node are a class code indicating a bridge and a predetermined subclass code indicating a bridge connecting a PCI bus and a PCI bus; and
in a case where the class code and the subclass code of the PCI node are the class code indicating the bridge and another subclass code being different from the predetermined subclass code and a specific subclass code; and
not execute the search in a case where the class code and the subclass code of the PCI node are the class code indicating the bridge and the specific subclass code being different from the predetermined subclass code.

2. The information processing apparatus according to claim 1, wherein the processor determines to execute the search in a case where the class code and the subclass code of the PCI node are the class code indicating the bridge and a subclass code other than the predetermined subclass code and the specific subclass code.

3. The information processing apparatus according to claim 1, wherein the search includes obtaining a vendor ID of the downstream PCI node from the downstream PCI node within a predetermined time period.

4. The information processing apparatus according to claim 3, wherein the search again obtains the vendor ID from the downstream PCI node in a case where the obtained vendor ID includes a number indicating a device number that connects nothing.

5. The information processing apparatus according to claim 1, wherein the processor determines, based on a class code and a subclass code of the downstream PCI node, whether or not to execute a further search for a further downstream PCI node on a PCI bus at a further downstream side of the downstream PCI node, with respect to the downstream PCI node.

6. The information processing apparatus according to claim 1, wherein, in determining whether or not to execute the search, the processor determines whether or not:
the class code of the PCI node is the class code indicating the bridge; and
the subclass code of the PCI node is the specific subclass code in a case where the class code of the PCI node is determined to be the class code indicating the bridge.

7. The information processing apparatus according to claim 6, wherein the processor determines to:
execute the search in a case where the subclass code of the PCI node is determined to be the predetermined subclass code or the another subclass code; and
not execute the search in a case where the subclass code of the PCI node is determined to be the specific subclass code.

8. The information processing apparatus according to claim 6 wherein, in determining whether or not to execute the search, the processor does not determine whether or not the subclass code of the PCI node is the specific subclass code in a case where the class code of the PCI node is determined to be not the class code indicating the bridge.

9. The information processing apparatus according to claim 1, wherein:
the class code of the PCI node is one byte of information stored in a class code register of a configuration register of the PCI node, and
the subclass code of the PCI node is one byte of information stored in a subclass register of the configuration register of the PCI node.

10. A method of controlling an information processing apparatus having a processor, at least one peripheral component interconnect (PCI) bus connecting the processor and at least one device, and at least one PCI bridge, the method being executable by the processor and comprising the steps of:
determining, based on a class code and a subclass code of a PCI node on the at least one PCI bus, whether or not to execute a search for searching for a downstream PCI node on a PCI bus at a downstream side of the PCI node and initializing the searched downstream PCI node;
determining to execute the search:
in a case where the class code and the subclass code of the PCI node are a class code indicating a bridge and a predetermined subclass code indicating a bridge connecting a PCI bus and a PCI bus;
in a case where the class code and the subclass code of the PCI node are the class code indicating the bridge and another subclass code being different from the predetermined subclass code and a specific subclass code; and determining to not execute the search in a case where the class code and the subclass code of the PCI node are the class code indicating the bridge and the specific subclass code being different from the predetermined subclass code.

* * * * *